Figure 1:
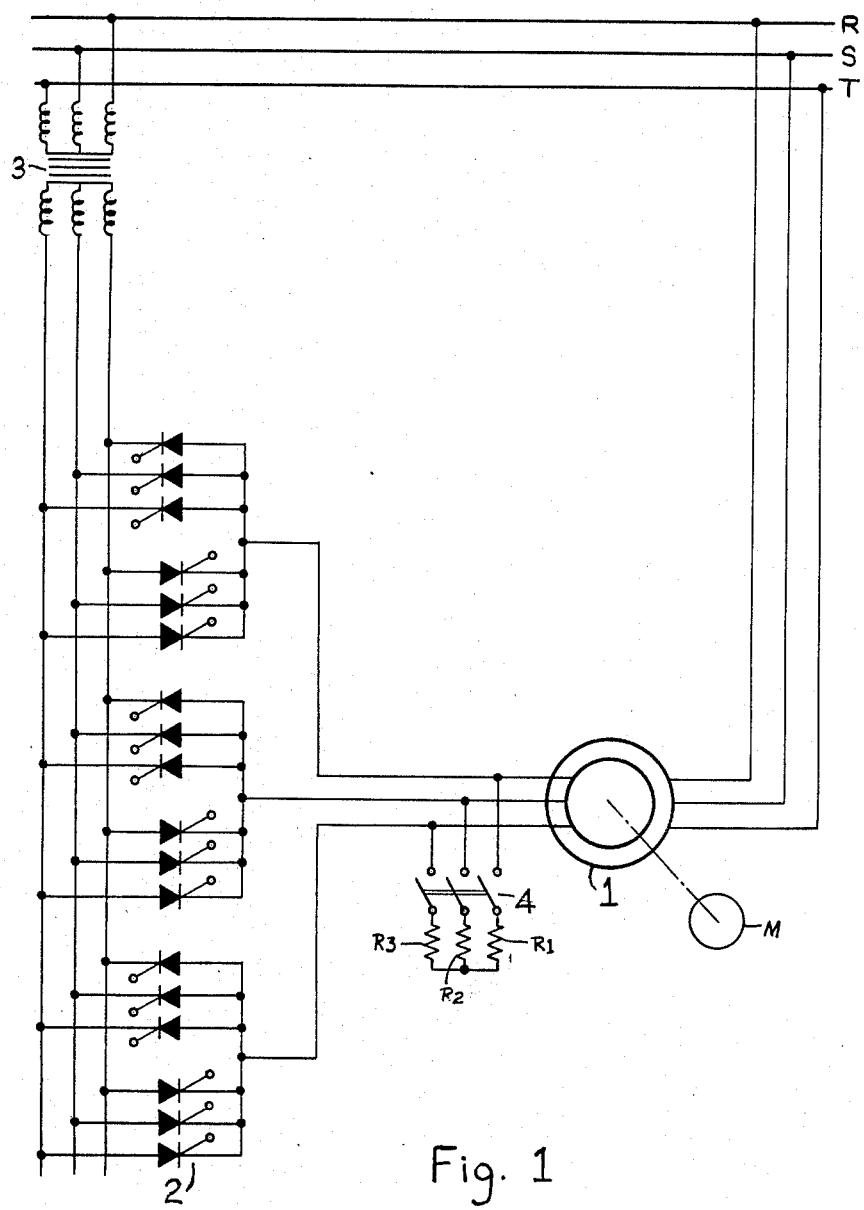

June 22, 1965     M. DEPENBROCK     3,191,116
PHASE MODIFIER FOR REACTIVE POWER PROTECTION
Filed June 19, 1961     2 Sheets-Sheet 1

INVENTOR.
Manfred Depenbrock
BY
Pierce Scheffler & Parker
Attorneys

INVENTOR.
Manfred Depenbrock

United States Patent Office 3,191,116
Patented June 22, 1965

3,191,116
PHASE MODIFIER FOR REACTIVE POWER
PROTECTION
Manfred Depenbrock, Mannheim-Almendorf, Germany,
assignor to Brown, Boveri & Cie, Aktiengesellschaft,
Mannheim, Germany, a joint-stock company
Filed June 19, 1961, Ser. No. 118,145
Claims priority, application Germany, June 24, 1960,
B 58,324
5 Claims. (Cl. 322—10)

The voltage maintenance of polyphase networks at high load surges, for example, in the operation of rolling trains or of electric furnaces, or at unintended load surges caused by short-circuits, requires the rapid availability of high wattless power.

This wattless power supply or wattless power coverage can occur to a certain degree by synchronous generators supplying the polyphase network. But since every wattless load surge of a synchronous generator is linked with a more or less great collapse of the terminal voltage, a corresponding increase of the exciting current is required. Generally this occurs automatically by the regulation of the exciter of the synchronous generator, but because of the inevitable sluggishness of the regulating process of such arrangements it occurs too slowly to be able to prevent temporary voltage drops.

This defect is taken into account by recently developed exciter arrangements of synchronous generators where the exciting current of the rotor is supplied over controlled gas-discharge rectifiers. By means of such arrangements it is possible to generate within a few cycles of the alternating voltages a multiple of the rated exciting current, so that the effects of the wattless load surges can be intercepted to a large extent. This procedure presupposes, however, that at the load surges, the synchronous generator remains loaded below its stability limit, that is, that its step limit is not exceeded. A further consequence of this is that the generator must be designed for the highest load peaks.

For this reason the required type output or power will be much greater than the normally needed wattless power requires. For the same stability reasons mentioned it is therefore also not readily possible to tap, for example, leading wattless current instead of lagging wattless current. For otherwise one could obtain the wattless power needed on the average more economically by condensers and cover only the components of the wattless power differing widely therefrom by a so-called phase shifter of smaller dimensions. Synchronous machines have until now been used for this purpose, but they have certain disadvantages. For the same reasons of stability mentioned before, it is also not always possible to utilize existing synchronous machines, serving to operate drive motors, for the compensation of wattless load surges at the same time.

It is, however, possible to avoid these stability difficulties by using in known manner asynchronous machines with slip ring rotors as phase shifters, whose rotor currents are taken from so-called follower machines. Such phase shifter machines can, as is known, absorb or give off any desired lagging or leading currents within a range corresponding to the size of the machine.

These rotating phase shifters, consisting of an induction machine operated as asynchronous machine and a follower machine, have the further disadvantage, however, besides the necessity of servicing the collectors of the machine, that the regulation of such an arrangement cannot occur fast enough, since generally several magnetic fields must be controlled.

However, also in these so-called regulating sets, much better regulating properties of a phase shifter can, as is known, be achieved if the follower machine is replaced by current rectifiers. However, these good regulating properties can be fully utilized only if the regulation controls the speed of the rotor on the one hand and picks up the wattless power on the other hand, independently of each other.

For a phase shifter for wattless power coverage, in particular at load surges, which consists of an asynchronous induction machine with slip ring rotor and a frequency-elastic electric valve converter inserted between the slip ring connections of the rotor and the feeding polyphase network, the invention provides a regulating circuit composed of three regulators which acts on the control of the converter, where the components of the rotor currents determining the torque of the rotor are reproduced by the first regulator proportionally to the regulation deviation of the speed of rotation or of the effective power as slip-frequency auxiliary alternating voltages, where the components of the rotor currents determining the wattless power are reproduced by the second regulator proportionally to the regulation deviation of the wattless power as slip-frequency auxiliary alternating voltages, and where, by means of the third regulator, formed of three individual regulators and assigned to the three phases of the rotor, there are formed, from the comparison of the summation voltage of said two auxiliary alternating voltages per phase furnishing the theoretical value of the rotor current with the actual value of the rotor current of the same phase represented as voltage, setting quantities which over a grid control device serve to control the electric valve converter, and where so-called multipliers are used for the formation of the amplitude and of the slip frequency of the auxiliary alternating voltages according to the setting quantities of the two-first named regulating circuits, the line-frequency and the speed-frequency alternating voltages.

By the components of the rotor currents determining the torque of the rotor there must be understood the effective components of these currents, while by the components of the rotor currents determining the wattless power there are meant the wattless components of these currents.

By multipliers are understood electric devices which so process pairs of input voltages supplied to them that as output voltage there appear a voltage proportional to the product of the input voltages. They may consist, for example, of Hall-generators or be composed of structural elements of other principles of operation.

Figure 2:
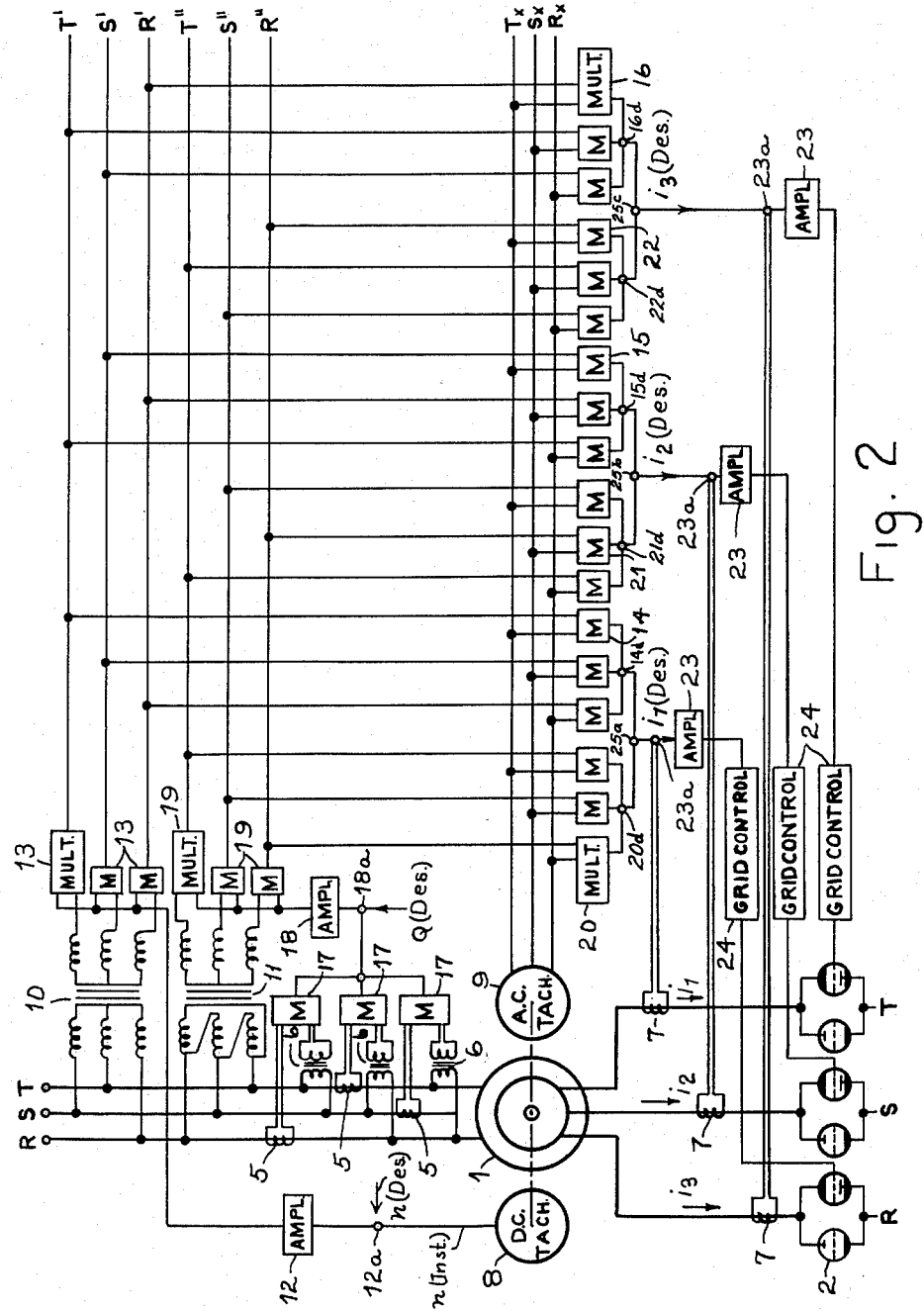

An example of construction of a phase modifier or shifter arrangement according to the invention is illustrated in FIGS. 1 and 2.

FIG. 1 shows a schematic wiring diagram of the basic components of the phase shifter carrying heavy current. In it 1 is an asynchronous induction machine with slip ring rotor, which, if desired, may also be driven by a driving machine not shown. The stator winding of the asynchronous machine is connected to the polyphase network having the phases R, S, T. The slip rings of the rotor are connected to a three-phase electric valve converter 2 which converts over a transformer 3 the slip-frequency alternating currents into line-frequency currents and thus establishes the connection with the polyphase network. The electric valve converter is composed, for example, of 9 pairs of controllable semi-conductor rectifier valves in counter-parallel arrangement.

In addition, a short-circuiting switch 4 is provided which serves for short-circuiting the rotor during starting of the machine, if desired over starter resistances R1, R2 and R3. During the starting operation, the rectifier valves are closed. After attainment of the theoretical speed, which should advantageously be put little below the synchronous speed, the short-circuiting switch 4 is opened and the electric valve converter is so controlled that the rotor maintains its speed and the machine transmits the desired wattless power. Likewise, it is possible to accelerate the asynchronous machine to the desired speed by means of a special driving machine M.

A regulating device according to the invention for adjustment of the speed and of the desired wattless power is illustrated in FIG. 2 as a block diagram.

On the left side of FIG. 2 is shown the asynchronous machine 1 which leads from the stator winding and from the slip rings of the rotor. The electric valve converter 2 connected to the slip rings is indicated only by two valves per phase in counter-parallel connection, this diagram being conceived with the use of controlled gas-discharge valves. The other connections of the converter 2 with the network phases, R, S, T are not shown. Current transformers 5 are inserted into the leads of the stator winding and voltage transformers 6 are connected between pairs of these leads. Current transformers 7 are provided in the lines leading from the slip rings of the rotor to the converter 2.

The speed $n$ of the rotor of the phase shifter machine 1 is measured by means of a tachometer generator 8 coupled with the rotor shaft which furnishes a direct voltage proportional to the speed. In addition, there is coupled with the rotor shaft another tachometer generator 9 which furnishes three alternating voltages of the speed frequency $f_x$ forming a three-phase system. By speed frequency is designated that frequency of the alternating voltages which corresponds to the speed of the rotor. It is generally given by $f_x=(1-s)f$, where $f$ is the line frequency and $s$ the slip of the rotor. The voltage system of the tachometer generator 9 is designated by $R_x$, $S_x$, $T_x$.

The direct voltage furnished by the tachometer generator 8 and corresponding to the actual speed $n_{ist}$ is supplied together with a predetermined direct voltage corresponding to the theoretical speed $n_{soll}$ to a regulator with the regulation amplifier 12 and the comparing member 12a, whose output voltage proportional to the regulation deviation forms the one input voltage of the multipliers 13. By regulation deviation is designated, as is known, the difference between theoretical and actual value. The other input voltages of these multipliers are taken via an auxiliary transformer 10 from the line-frequency voltages of the polyphase network R, S, T. The multipliers, formed, for example, by Hall-generators, produce an output voltage which is proportional to the product of the two input voltages. In this way a line-frequency polyphase current system R′, S′, T′ is formed whose voltage amplitude is proportional to the output voltage of the regulator 12, that is, proportional to the regulation deviation of the rotor speed.

From these alternating voltages of the system R′, S′, T′ there is to be formed the one component of the control voltages of the converter 2, whose function it is to adjust the desired speed of rotation. But since the rotor currents, which are returned to the polyphase network R, S, T over the converter 2, have at first the slip frequency $s\cdot f$, the alternating voltages of the system R′, S′, T′ are to be transformed into slip-frequency voltages. For this purpose the alternating voltages of the system R′, S′, T′ are supplied as the one input voltage to the 3 x 3 multipliers 14, 15, 16. The second input voltage of these multipliers is taken from the polyphase tachometer generator 9, which furnishes the speed-frequency voltages of the system $R_x$, $S_x$, $T_x$. Consequently, the output voltages of the multipliers 14, 15, 16 which are proportional to the product of the input voltages, are given by the product of the line-frequency and speed-frequency voltages.

According to a known maxim of circular functions, the product of two sine functions with different frequencies furnishes two new sine functions whose frequency is equal to the difference or equal to the sum of the two frequencies mentioned. Since the two input voltages—to be assumed as sine-shaped—of the multipliers have in the present case the frequencies $f$ or $(1-s)f$, each multiplier furnishes a voltage with the difference frequency, that is, the slip frequency $s\cdot f$. The additionally formed voltages of the summation frequencies are, as is found, inoperative in their total effect in the circuit arrangement of the three multipliers per phase.

Of the 3 x 3 multipliers 14, 15, 16 whose input leads are connected to the polyphase current systems R′, S′, T′, or $R_x$, $S_x$, $T_x$ in cyclic interchange, groups of three are combined in such manner that their output voltages are connected in series at 14d, 15d and 16d, respectively. Each of these three summation voltages thus formed is assigned control-technologically to a phase of the rotor leads of the asynchronous machine. At correct adjustment of the phase position of the tachometer generator 9 according to frequency and phase, these summation voltages correspond to a reproduction of the active component of the rotor currents. Their amplitude, which determines the required control operation for attaining the desired theoretical speed, adjusts itself—on the basis of the cooperation described later with another regulator—in such a way that the summation voltages furnish the theoretical value of the active component of the rotor currents and hence, the rotor speed.

The further function of the regulating device is to produce a voltage reproduction of the wattless component of the rotor currents which furnishes the required control operation for attaining the desired theoretical wattless power.

For this purpose a direct voltage is formed which corresponds to the actual value of the wattless power on the stator side of the asynchronous machine. This is done by means of the current transformers 5 and the voltage transformers 6, which each are connected at the primary end to an interlinked voltage of the network RST, so that their secondary voltages are shifted by 90 deg., against the respective phase voltages in relation to the zero point not shown. At their secondary sides the current transformers and voltage transformers are each connected to two inputs of the three multipliers 17. The sum of the three output voltages of the multipliers is a measure of the actual wattless power on the stator side. This summation voltage and a voltage representing the theoretical wattless power act on a regulator with the regulating amplifier 18 and the comparing member 18a. The output voltage of this regulating amplifier is a direct voltage which is proportional to the regulation deviation of the wattless power of the stator.

This output voltage of the regulating amplifier 18 forms one input voltage of the three multipliers 19. The second input voltage of these multipliers is derived from the polyphase network R, S, T via the auxiliary transformer 11. The output voltages of the multipliers 19 which furnish the system R″, S″, T″ are, therefore, line-frequency alternating voltages whose amplitude is proportional to the regulation deviation of the wattless power. Due to the primary triangle connection of the transformer 11, however, their phase is shifted by 90 deg. against the system R′, S′, T′.

From these voltages of the system R", S", T" there are to be formed again corresponding voltages of the slip frequency. For this purpose they are supplied to the 3 x 3 multipliers 20, 21, 22 to which are fed in addition again the alternating voltages of the system $R_x$, $S_x$, $T_x$. Groups of three of these multipliers are again connected in series at the output at 20d, 21d, and 22d, respectively. The resulting summation voltages are, with respect to frequency and phase position, reproductions of the wattless component of the rotor currents corresponding to the three phases of the rotor. Their amplitude, which determines the required control operation for attaining the desired theoretical wattless power, adjusts itself on the basis of the cooperation with the additional regulator in such manner that the summation voltages furnish the theoretical value of the wattless component of the rotor currents.

The two voltages of the multipliers 14, 20 or 15, 21 or 16, 22 are now also totalled at 25a, 25b and 25c, respectively and supplied to a regulator, consisting of three individual regulators, with the regulating amplifiers 23 and the comparing members 23a. The actual current values supplied to the same regulators 23, which are to be compared with the aforesaid theoretical current values, are taken from the current transformers 7 as current-proportional voltages.

This regulator 23, 23a closes the regulating circuit serving to regulate the effective and wattless components of the rotor currents. The setting quantities formed from the regulating deviations of the regulator 23, 23a are supplied to a grid control device 24 which produces the grid voltages required for the control of converter 2. By this control of the converter, each deviation of the effective and wattless components of the rotor currents from the particular predetermined theoretical values is readjusted until the regulating circuit comes to rest. The herein operative regulators 12, 12a, 18, 18a and 23, 23a may, of course, be provided in a manner known in itself with time members to attain the required stability of the regulating circuit and a certain regulating performance.

The multipliers of the regulating device may be formed in different ways. Besides the Hall-generators mentioned as an example, there are a number of devices which bring about a multiplication of two quantities. Thus, there are arrangements with electric machines whose exciting current forms, for example, the one factor of the product formation and which are driven with a speed corresponding to the other factor, in the present case the alternating voltage amplitude. In addition, rotary field systems, termed also inductive transmitters, have been used. However, these arrangements are relatively sluggish and therefore less suitable. Among the more recent inertia-free processes or devices there may be mentioned, besides the Hall-generators already referred to, the so-called two-parabola process, also potentiometers with servo drive, the pulse modulation process, and the hyperbolic-field and cross-field tubes. Among these devices, which all serve to multiply two quantities, the first-named device, called two-parabola process, is particularly advantageous. It is based on the mathematical equation $$(a+b)^2-(a-b)^2=4ab$$

From the two input quantities of the multiplier designated by $a$ and $b$ there are formed at first the quantities $a+b$ and $a-b$, and these are squared in so-called function patterns with quadratic characteristic. The difference of the output quantities of the function patterns, multiplied by the factor 0.25, then furnishes the product $a.b$. The advantage of this process is that the multiplication can be performed at great speed and the device can be produced in small dimensions.

Concerning the regulation of the speed of rotation, it may be mentioned further that it is advisable to make the slip so small that only relatively small voltages are induced in the rotor circuit, while yet making it large enough to give the converter a current load favorable with respect to the heating of its discharge valves.

I claim:
1. In a phase shifter for covering idle power, and particularly under load surge conditions, the combination comprising an asynchronous machine (1) having a 3-phase stator winding connected to a 3-phase power network (R–S–T) and a 3-phase slip ring rotor; a 3-phase controllable grid converter system (2) arranged in the phase connections between the slip rings of said rotor and the corresponding phases of said network; a first tachometer generator (8) driven by said asynchronous machine and producing a direct voltage proportional to the actual speed of the rotor of said asynchronous machine; a second tachometer generator (9) also driven by said asynchronous machine and producing a 3-phase alternating voltage whose frequency is proportional to the actual speed of the rotor of said asynchronous machine, said 3-phase alternating voltage being applied to establish a first auxiliary 3-phase alternating voltage network ($R_x$–$S_x$–$T_x$); a first group of three multipliers (13) whose respective output voltages are applied to establish a second auxiliary 3-phase alternating voltage network (R'–S'–T') having the same frequency as said power network, each of said multipliers (13) having two input voltages which are multiplied, the first of each of said input voltages being derived from the respective phases of said power network and the second of each of said input voltages being proportional to the difference between the direct voltage produced by said first tachometer generator (8) and a voltage corresponding to a theoretical speed for the rotor of said asynchronous machine; a second group of three multipliers (19) whose respective output voltages are applied to establish a third auxiliary 3-phase alternating voltage network (R"–S"–T") having the same frequency as said power network, each of said multipliers (19) having two input voltages which are multiplied, the first of each of said input voltages being derived from the respective phases of said power network and the second of each of said input voltages being proportional to the difference between the actual and theoretical values of wattless power on the stator side of said asynchronous motor; a first group of 3 x 3 multipliers (14, 15, 16) each having two input voltages, the first of each of said input voltages being the corresponding phase voltages of said second auxiliary network (R'–S'–T') and the second of each of said input voltages being the corresponding phase voltages of said first auxiliary network ($R_x$–$S_x$–$T_x$), circuit means connecting the output voltages of each 3 x 3 multiplier of said first group in series to obtain a first group of summation voltages (14d, 15d, 16d); a second group of 3 x 3 multipliers (20, 21, 22) each having two input voltages, the first of each of said input voltages being the corresponding phase voltages of said third auxiliary network (R"–S"–T") and the second of each of said input voltages being the corresponding phase voltages of said first auxiliary network ($R_x$–$S_x$–$T_x$), circuit means connecting the output voltages of each 3 x 3 multiplier of said second group in series to obtain a second group of summation voltages (20d, 21d, 22d); circuit means connecting together in series corresponding summation voltages of said first and second groups to establish three regulating voltages (25a, 25b, 25c); means comparing each of said regulating voltages respectively with a voltage proportional to the current flow in the respective phase of said rotor of said asynchronous machine to obtain a difference voltage; and grid control devices (24) for said converters controlled respectively by said difference voltages.

2. A phase shifter as defined in claim 1 and which further includes a starter switch connected to the phases of the rotor of said asynchronous machine, said switch being closed to short-circuit the phases of said rotor when starting said asynchronous machine, said converter being blocked during starting of said asynchronous machine and said grid control devices being operative only when the theoretical speed of the rotor of said asynchronous machine is reached.

3. A phase shifter as defined in claim 2 wherein starting resistances are connected with said starter switch to limit current flow upon short-circuiting.

4. A phase shifter as defined in claim 1 and which further includes a drive machine coupled to said asynchronous machine for starting the latter, said converter being blocked during starting of said asynchronous machine and said grid control devices being operative only when the theoretical speed of the rotor of said asynchronous machine is reached.

5. A phase shifter as defined in claim 1 wherein by proper determination of the theoretical speed of rotation the slip of the rotor of said asynchronous machine is held so small that only relatively small voltages are induced in the rotor circuit but is yet large enough to provide said converter with a current load favorable with respect to heating of its discharge valves.

References Cited by the Examiner
UNITED STATES PATENTS
3,012,185   12/61   Johnson _____ 322—61

LLOYD McCOLLUM, *Primary Examiner.*